United States Patent
Beardsley et al.

(10) Patent No.: US 8,677,733 B2
(45) Date of Patent: Mar. 25, 2014

(54) DUCTED FAN GAS TURBINE ASSEMBLY

(75) Inventors: Peter K. Beardsley, Derby (GB); Crispin D. Bolgar, Nottingham (GB)

(73) Assignee: Rolls-Royce, PLC, London (GB)

( * ) Notice: Subject to any disclaimer, the term of this patent is extended or adjusted under 35 U.S.C. 154(b) by 80 days.

(21) Appl. No.: 13/549,738

(22) Filed: Jul. 16, 2012

(65) Prior Publication Data
US 2013/0025259 A1    Jan. 31, 2013

(30) Foreign Application Priority Data

Jul. 28, 2011 (GB) .................................. 1112986.3

(51) Int. Cl.
*F02K 3/02*    (2006.01)
(52) U.S. Cl.
USPC ........................................................ 60/226.2
(58) Field of Classification Search
USPC ................. 60/226.2, 226.3, 230; 239/265.19, 239/265.23, 265.2, 265.25
See application file for complete search history.

(56) References Cited

U.S. PATENT DOCUMENTS 3,779,010 A * 12/1973 Chamay et al. .............. 60/226.2
3,829,020 A   8/1974 Stearns
2008/0010969 A1 * 1/2008 Hauer et al. .................... 60/204
2009/0151320 A1   6/2009 Sternberger
2010/0005777 A1 * 1/2010 Marshall ......................... 60/204

FOREIGN PATENT DOCUMENTS

WO    WO 83/03281 A1    9/1983
WO    WO 2008/045072 A1    4/2008

OTHER PUBLICATIONS

Search Report issued in British Patent Application No. 1112986.3 dated Nov. 24, 2011.

* cited by examiner

*Primary Examiner* — Phutthiwat Wongwian
(74) *Attorney, Agent, or Firm* — Oliff PLC

(57) ABSTRACT

A ducted fan gas turbine assembly has a propulsive fan driven by a core engine. The turbine assembly has an annular bypass duct which receives an airflow from the fan and is bounded on the radially inward side by the core engine and on the radially outward side by an engine nacelle. The turbine assembly has a thrust reverser assembly having a vane arrangement including a first set of turning vanes for channelling airflow from the duct in a rearward direction, a second set of turning vanes for channelling airflow from the bypass duct in a forward direction. The thrust reverser assembly includes a plurality of blocker doors which are deployable to block the bypass duct. The nacelle has stationary and movable cowl portions that cooperate with the thrust reverser assembly to provide several operational configurations.

9 Claims, 3 Drawing Sheets

DUCTED FAN GAS TURBINE ASSEMBLY

FIELD OF THE INVENTION

The present invention relates to a ducted fan gas turbine assembly.

BACKGROUND OF THE INVENTION

With reference to FIG. 1, a ducted fan gas turbine engine generally indicated at 10 has a principal and rotational axis X-X. The engine comprises, in axial flow series, an air intake 11, a propulsive fan 12, and a core engine including an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the core engine and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Large ducted fan gas turbine engines are conventionally fitted with a thrust reverser which reverses the second air flow B on landing to assist with aircraft deceleration. The thrust reverser typically comprises a series of fixed cascade boxes which contain turning vanes for channelling airflow from the bypass duct in a forward direction, the cascade boxes being installed in the nacelle 21 around the bypass duct 22. The nacelle is formed with a pair of translating sleeve cowls which, in normal operation, shield the cascade boxes from the external airflow and from the second air flow B. To operate the thrust reverser, the sleeve cowls are translated rearwardly to expose the cascade boxes both internally and externally and to deploy blocker doors which block the bypass duct 22 and force the second air flow B through the cascade boxes. Conventionally, the blocker doors are deployed via drag links which are each attached at one end to the respective door and at the other end to a fixed structure at the inner surface of the bypass duct 22

In FIG. 1, the bypass exhaust nozzle 23 has a fixed area. However, variable area bypass nozzles are known and can be used to control the discharge area for the second air flow B so that the engine can operate efficiently over a wider range of operating conditions. In particular, a present trend towards lower pressure ratio engines increases the desirability of controlling fan stability margins by varying the bypass exhaust nozzle discharge area.

Combining elements of a thrust reverser and a variable area nozzle can help to reduce engine weight, as well as providing other operational advantages.

U.S. Pat. No. 5,655,360 proposes a thrust reverser for both modulating and reversing bypass flow discharged from a fan through a bypass duct. The reverser includes an aft cowl which has an aft end surrounding the core engine to define a discharge nozzle, and is translatable rearwardly to increase the discharge area of that nozzle. Further rearward translation, however, exposes cascade turning vanes and causes deployment of blocker doors to produce reverse thrust. A disadvantage, however, of the proposal of U.S. Pat. No. 5,655,360 is that to produce large increases in the discharge area of the nozzle it is necessary for the aft cowl to be translated a relatively long distance. This complicates both the actuation mechanism for the cowl translation, and also the actuation mechanism for deployment of the blocker doors which must only be deployed when further rearward translation exposes the cascade turning vanes. A further disadvantage of this arrangement is that a single actuator varies the area of the discharge nozzle, and provides thrust reversal. Such a system poses a risk that the thrust reverser could deploy in flight, which may lead to the loss of the aircraft. Complex safety systems would therefore be required, further complicating the design. US 2008/0010969 proposes a nacelle for a gas turbine engine having a first cowl and a second cowl which is repositionable with respect to the first cowl. The second cowl can be positioned to provide either external wing blowing in a first position (to be used for example on landing) or thrust reversal in a second position. In the first position, the total quantity of airflow channelled through the fan nozzle is reduced to provide reduced thrust through the nozzle when external blowing is provided. The total effective flow area of the gas turbine is thereby either maintained or reduced in the first position in comparison to the second position.

SUMMARY OF THE INVENTION

It would be desirable to provide a combined thrust reverser and variable area nozzle which can overcome some or all of these disadvantages.

Accordingly, in a first aspect, the present invention provides a ducted fan gas turbine assembly having:
 a propulsive fan driven by a core engine,
 an annular bypass duct which receives an airflow from the fan and is bounded on the radially inward side by the core engine and on the radially outward side by an engine nacelle, the bypass duct terminating in a primary discharge nozzle for the duct airflow, and
 a thrust reverser assembly having a vane arrangement including a first set of turning vanes for channelling airflow from the duct in a rearward direction, and a second set of turning vanes for channelling airflow from the bypass duct in a forward direction;
 wherein the nacelle has a stationary cowl portion and a movable cowl portion which is translatable rearwardly relative to the stationary cowl portion to open an annular gap therebetween, the cowl portions cooperating with the thrust reverser assembly to provide first, second and third operational configurations, whereby in the first operational configuration the gap between the cowl portions is closed and the vane arrangement is stowed in the nacelle to prevent airflow from the duct flowing therethrough, in the second operational configuration the first set of turning vanes is positioned in the gap opened between the cowl portions to form an annular secondary discharge nozzle from the bypass duct for the duct airflow, such that the total effective flow area of the primary nozzle and the gap in the second operational configuration is greater than the total effective flow area of the primary nozzle in the first operational configuration, and in the third operational configuration the second set of turning vanes is positioned in the gap opened between the cowl portions to divert the duct airflow through the second set of turning vanes and provide reverse thrust.

The primary and secondary discharge nozzles effectively form a variable area nozzle, i.e. the total effective flow area of the primary nozzle and the gap is increased when the cowl is in the second position, and reduced when the cowl is in the first position. This allows the engine to operate more efficiently over a range of operating conditions, particularly at lower pressure ratio. However, by forming the secondary discharge nozzle as a separate annulus, forward of the primary discharge nozzle, it is possible to produce a relatively large increase in the combined discharge areas of the nozzles from a relatively small amount of rearward translation of the movable cowl portion. The ability of the first set of turning vanes to channel airflow from the duct in a rearward direction improves the efficiency of the secondary discharge nozzle.

The gap between the stationary cowl portion and a movable cowl portion enables both the variable area nozzle and the thrust reverser functionality. To produce this gap, only one circumferential split line in the nacelle (at the interface of the stationary and movable cowl portions) is typically required, which is aerodynamically and acoustically advantageous compared with other possible arrangements where a variable area nozzle and a thrust reverser may require respective split lines.

In a second aspect, the present invention provides a vane arrangement for use in a thrust reverser assembly of a ducted fan gas turbine assembly according to the first aspect.

Optional features of the invention will now be set out. These are applicable singly or, to the extent that they are compatible, in any combination with any aspect of the invention.

The assembly may include a plurality of blocker doors which are deployable to block the bypass duct. The blocker doors may be stowed to permit airflow through the bypass duct in the first and second operational configurations and deployed to block the bypass duct in the third operational configuration.

In a first embodiment, the vane arrangement may be translatable rearwardly from a forward position in the first operational configuration to a rearward position in the third operational configuration. This allows the vane arrangement to be stowed in a more forward location, enabling the nacelle to be shortened and/or at rearward locations to be more tightly wrapped around the engine, both of which changes can provide aerodynamic benefits. Furthermore, such an arrangement enables the vane arrangement to be "locked out" to prevent accidental deployment in flight, i.e. to prevent accidental movement from the second operational configuration to the third operational configuration.

In a second embodiment, the vane arrangement may remain in a single position relative to the stationary cowl portion in the first, second and third operational configurations. This simplifies the activation of the secondary discharge nozzle, which can then merely require the movable cowl portion to be translated rearwardly to open the annular gap.

In the first embodiment, the first set of turning vanes may be positioned rearward (with respect to the direction of airflow in the first operational condition) of the second set of turning vanes. Thus, for example, when the vane arrangement is translatable rearwardly from a forward position in the first operational configuration to a rearward position in the third operational configuration but remains in the forward position in the second operational configuration, the first set of turning vanes can conveniently be located at a position such that the gap between the stationary and movable cowl merely has to open around that position.

In the second embodiment, the first set of turning vanes may be positioned forwardly of the second set of turning vanes. Thus, in the second embodiment, only the first set of turning vanes is positioned in the gap in the second operational configuration, and both the first and second turning vanes are positioned in the gap in the third operational configuration.

The movable cowl portion can be translated further rearwardly in the third operational configuration than in the second operational configuration to increase the width of the gap in the third operational configuration relative to the width of the gap in the second operational configuration. In this way, the gap can accommodate high airflows during thrust reversal. The vane arrangement may be translated rearward between the second and third operational configurations such that the first set of turning vanes is covered by the moveable cowl portion in the third operational configuration.

Conveniently, the blocker doors can be carried by the movable cowl portion and can be connected to the radially inward side of the bypass duct by respective drags links which pull the blocker doors across the duct when the movable cowl portion is translated further rearwardly in the third operational configuration. For example, the drag links may be over-centre drag links which pass over-centre when the movable cowl portion is translated rearwardly from the first operational configuration to the second operational configuration. The use of over-centre drag links prevents the deployment of the blocker doors during the second operational configuration.

Typically, the first set of turning vanes and the second set of turning vanes both extend substantially entirely around the circumference of the bypass duct, or at least around the circumference of the duct through which air flows in use.

The vane arrangement may have one or more cascade boxes which house the first set of turning vanes and the second set of turning vanes. The cascade boxes can conveniently provide a load path for reacting the loads which operate on the first set of turning vanes.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
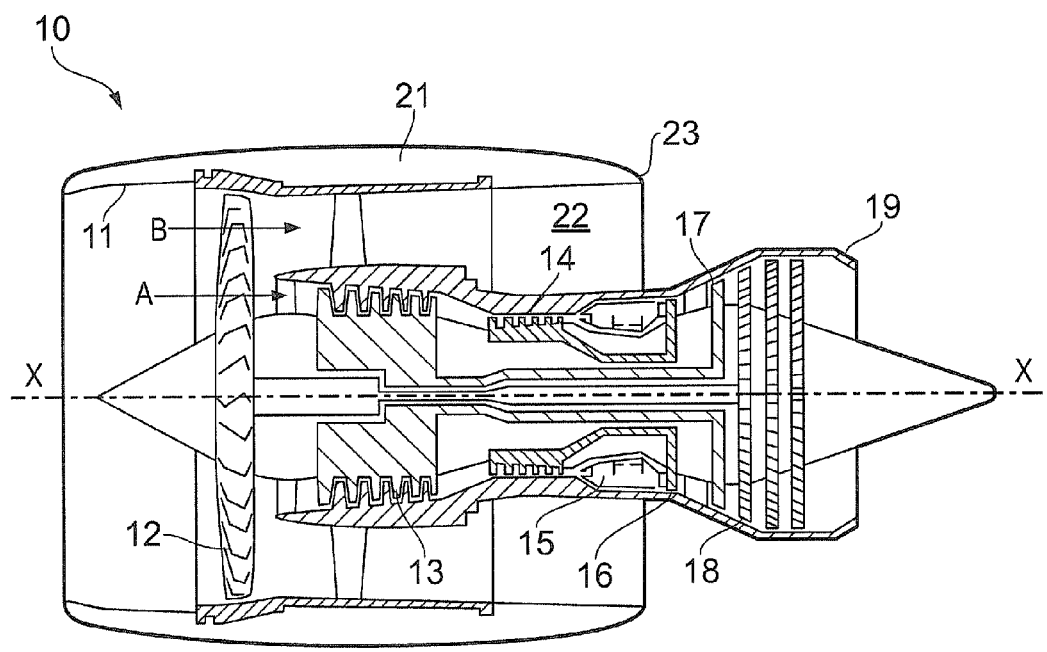
FIG. 1 shows a schematic longitudinal section through a ducted fan gas turbine engine.
Figure 2:
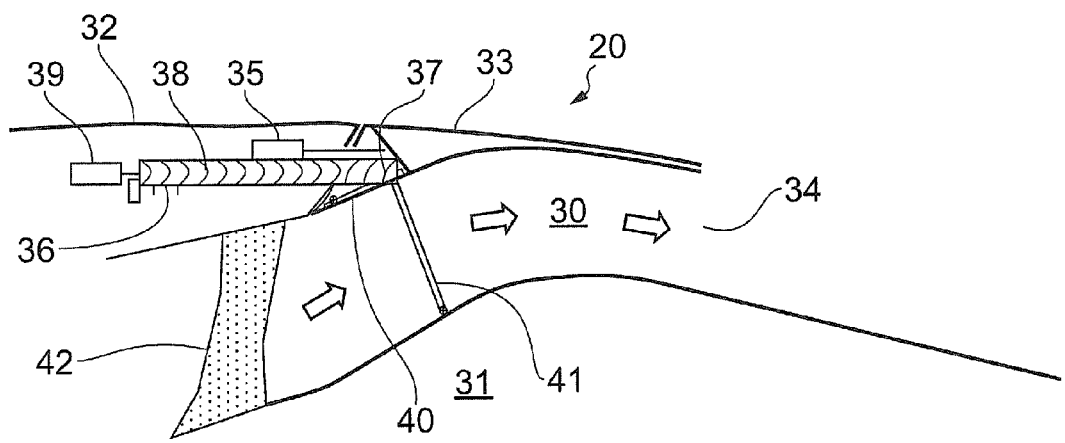
FIG. 2 shows a schematic longitudinal section through a first thrust reverser assembly in a first operational configuration.

FIG. 2 shows a schematic longitudinal section through a first thrust reverser assembly 20 in a first operational configuration. An annular bypass duct 30 receives an airflow (arrowed) from a propulsive fan (not shown) of a turbofan engine. The duct is formed between a core engine 31 and a nacelle and terminates in a primary discharge nozzle 34. The nacelle has a stationary cowl portion 32 and a movable cowl portion 33 which is translatable rearwardly relative to the stationary cowl portion. Typically, the movable cowl portion is formed as left engine side and right engine side half-cowls, which split apart about a vertical plane through the engine axis when moved rearwardly. Each half-cowl can be moved rearwardly by one or more first actuators 35 (only one shown in FIG. 2). Typically, there are at least two such actuators per half-cowl. In this embodiment, the first and second actuators 35, 39 are hydraulic actuators. However, electric or pneumatic actuators could be used.

The thrust reverser assembly 20 comprises a vane arrangement having a plurality of cascade boxes 36 (only one shown in FIG. 2) which each contain a first set of turning vanes 37 for channelling airflow from the duct in a rearward direction of the engine, and a second set of turning vanes 38 for channelling airflow from the bypass duct in a forward direction of the engine. The cascade boxes 36 form an annular structure which circumferentially surrounds the bypass duct 30. The first set of turning vanes 37 are rearward of the second set of turning vanes 38 in the cascade boxes, and the first actuators 35 are carried by the cascade boxes. A plurality of second actuators 39 (only one shown in FIG. 2) can be actuated to move the cascade boxes rearwardly.

The thrust reverser assembly 20 further comprises a circumferentially distributed arrangement of blocker doors 40 (only one shown in FIG. 2) which are carried by the movable cowl portion 33 and are deployable by respective over-centre drag links 41, as explained later, to block the bypass duct 30.

In the first operational configuration of the thrust reverser assembly illustrated in FIG. 2, the cascade boxes 36 are stowed outboard of a row of outlet guide vanes 42 located in the bypass duct 30. The movable cowl portion 33 abuts the stationary cowl portion 32, and prevents the air flow in the duct reaching the turning vanes 37, 38. More particularly, the stationary cowl portion covers the second set of turning vanes 38 and the movable cowl portion covers the first set of turning vanes 37.

Figure 3:
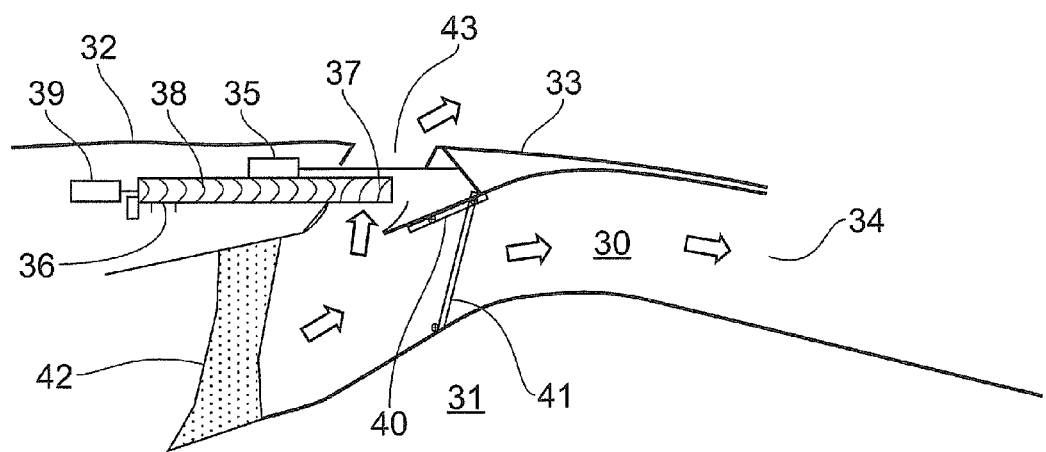
FIG. 3 shows a schematic longitudinal section through the thrust reverser assembly of FIG. 2 in a second operational configuration

FIG. 3 shows a schematic longitudinal section through the thrust reverser assembly in a second operational configuration in which the total discharge nozzle area (i.e. the total effective flow area of the primary nozzle and the gap) is increased. The first actuators 35 translate the movable cowl portion 33 rearwardly opening an annular gap 43 between the stationary cowl portion 32 and the movable cowl portion 33. The cascade boxes 36 remain in their stowed position outboard of the outlet guide vanes 42, but the gap opens around the first set of turning vanes 37 at the rear end of the cascade boxes. A portion of the airflow through the duct 30 is diverted outwardly through the gap and channelled by the vanes 37 in a rearward direction of the engine. The gap 43 thus forms a secondary discharge nozzle from the duct, such that the primary 34 and secondary discharge nozzles effectively provide a variable area nozzle. By forming the secondary discharge nozzle as an annulus, it is possible, with relatively small amount of rearward movement of the movable cowl portion to effect a relatively large increase in total discharge nozzle area. The vanes 37 improve the turning control and efficiency of the secondary discharge nozzle. Further, the load on the first set of turning vanes 37 produced by the airflow through the secondary discharge nozzle is conveniently reacted by the cascade boxes 36.

Each drag link 41 comprises a link extending across the bypass duct 30 between a pivotable connection at an outer surface of the core engine 31 and another pivotable connection at a rear edge of the corresponding blocker door 40, the front edge of the blocker door being pivotably connected to the movable cowl portion 33. In the second operational configuration, the relatively small rearwards translation of the movable cowl portion over-centres the link, which helps to ensure that the blocker doors remain in their stowed position overlying an inner surface of the movable cowl portion.

Figure 4:
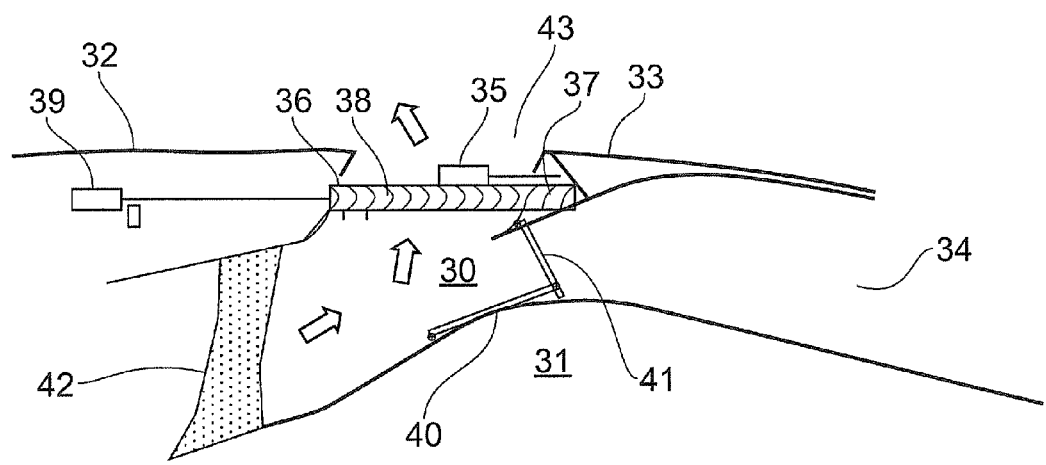
FIG. 4 shows a schematic longitudinal section through the thrust reverser assembly of FIG. 2 in a third operational configuration.

FIG. 4 shows a schematic longitudinal section through the thrust reverser assembly in a third operational configuration which provides thrust reversal. The second actuators 39 translate the cascade boxes 36 rearwardly. This moves the cascade boxes from their stowed position such that the second set of turning vanes 38 at the front end of the boxes are located in the gap 43. In addition, because the first actuators 35 are carried by the boxes, a further rearward translation of the movable cowl portion 33 is produced. The first actuators 35 retract the movable cowl portion by an amount relative to the cascade boxes in order to cover the first set of turning vanes 37. However, this retraction is more than outweighed by the further rearward translation of the movable cowl portion. In this way, the gap is widened further so that it can accommodate an increased airflow.

The thrust reverser assembly can go straight from the first operational configuration to the third operational configuration, in which case there is no need to retract the movable cowl portion 33 by an amount relative to the cascade boxes 36 in order to cover the first set of turning vanes 37, as they are already covered by the movable cowl portion in the first operational configuration.

The further rearward translation of the movable cowl portion 33 also causes the drag links 40 to deploy the blocker doors 41, whereby the bypass duct 30 is blocked and substantially all the airflow though the duct is diverted away from the primary discharge nozzle 34 and out through the gap 43, where it is channelled by the vanes 38 in a forward direction of the engine to effect thrust reversal.

Figure 5:
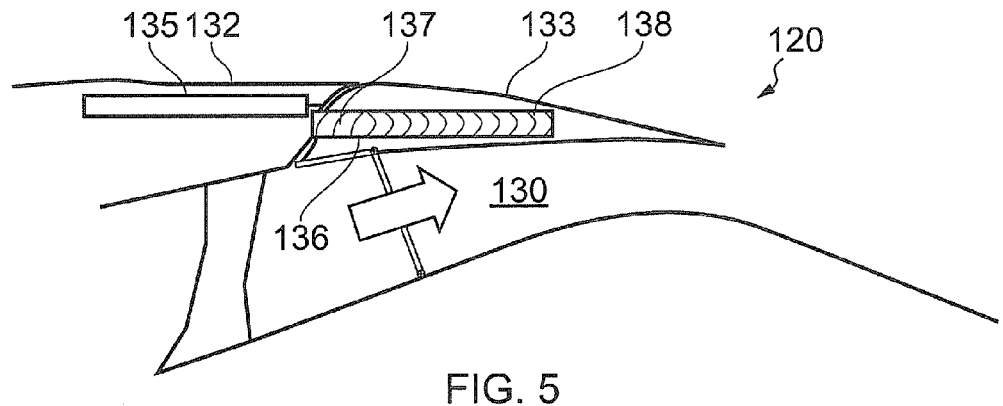
FIG. 5 shows a similar view to that of FIG. 2 but of a second thrust reverser assembly.

FIG. 5 shows a schematic longitudinal section through a second thrust reverser assembly 120 in a first operational configuration. An annular bypass duct 130 similar to the duct 30 is provided between the core and the nacelle. The nacelle includes a stationary cowl portion 132, and a moveable cowl portion 133, which again are similar in many respects to the cowl portions 32 and 33. The moveable cowl portion 133 can be moved rearwardly by one or more actuators 135 which extend between the stationary and moveable cowl portions. The assembly also includes blocker doors 140 and drag links 141, similar to those of the first embodiment.

The thrust reverser assembly includes a vane arrangement having a plurality of cascade boxes 136, each comprising a first set of turning vanes 137 for channelling airflow from the duct in a rearward direction, and a second set of turning vanes 138 for channelling the airflow in a forward direction. The cascade boxes 136 are similar to the cascade boxes 36, except that the first set of turning vanes 137 are located forward of the second set of turning vanes 138.

In the first operational configuration of the thrust reverser assembly 120 as illustrated in FIG. 5, the moveable cowl portion 133 abuts the stationary cowl portion 132. The cascade boxes 136 are affixed to an end of the stationary cowl portion 132, and are stowed within the moveable cowl portion 133. The airflow in the duct 130 is prevented from reaching the turning vanes 137, 138 by the moveable cowl portion 133.

Figure 6:
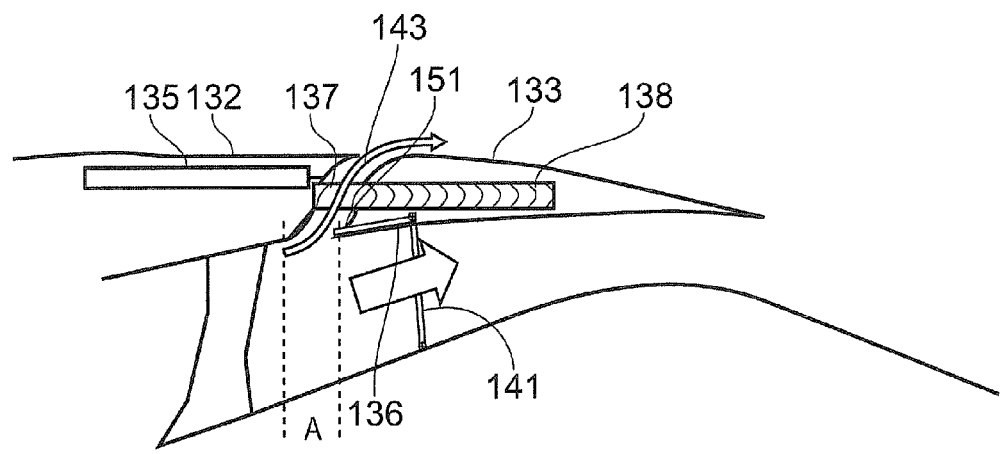
FIG. 6 shows a similar view to that of FIG. 3 but of the thrust reverser assembly of FIG. 5.

FIG. 6 shows the thrust reverser assembly 120 in the second operational configuration. The actuator 135 translates the moveable portion 133 rearwardly a first distance A from the stationary cowl portion to open an annular gap 143 between the stationary cowl portion 132 and moveable cowl portion 133. In this position, an annularly inner part 151 of the cowl portion 133 directs a portion of the airflow through the duct 130 to pass through the gap. In this configuration, only the first set of vanes 137 are exposed to the airflow in the duct, which vanes 137 channel a portion of the airflow in a rearward direction.

Figure 7:
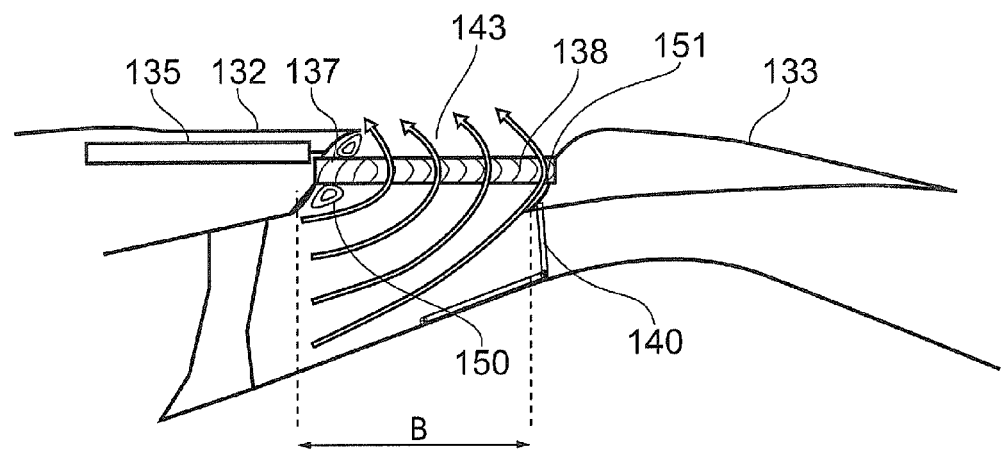
FIG. 7 shows a similar view to that of FIG. 4 but of the thrust reverser assembly of FIG. 5.

FIG. 7 shows the thrust reverser assembly 120 in the third operational configuration. In this configuration, the actuator 135 translates the moveable portion 133 rearwardly a distance B from the stationary portion to further open the annular gap 143. Movement of the moveable cowl portion 133 to the third position also causes the blocker doors 140 to deploy and block the main flow through the duct 130, as in the first embodiment.

In the third operational configuration, both the first and second sets of turning vanes 137, 138 are exposed to the airflow through the gap. However, the airflow is nevertheless directed forwards for two main reasons.

Firstly, the second set of turning vanes 138 extend over a larger portion of the cascade boxes 136 compared to the first set of turning vanes 137. Secondly, by arranging the first set of turning vanes 137 forward of the second set of turning vanes 138, the airflow through the first set of turning vanes is caused to recirculate through the turning vanes 137 by the forward airflow, thereby minimising forward flow, as indicated by flow lines 150 shown in FIG. 7. The part 151 is also spaced from the vanes 137 in the third configuration, and does not therefore direct air towards the vanes 137. This second embodiment provides a simpler arrangement in comparison to the first embodiment, as only a single actuator is required, while still providing efficient forward and reverse thrust. Advantageously, in both embodiments, both variable area nozzle and thrust reverser functionality can be achieved with just one split line between the stationary and movable cowl portions, which improves aerodynamic efficiency and reduces noise production. Further, and particularly in the first embodiment, the cascade boxes 36 can be stowed in a relatively forward location (outboard of the nozzle guide vanes 42) where the nacelle tends already to be relatively thick, e.g. to accommodate the fan case. Thus, the nacelle may not need to be specially lengthened or thickened to accommodate the boxes.

In operation on an aircraft, the variable area nozzle would normally be set to the first position during a cruise power setting, the third position during landing to produce reverse thrust, and the second position where high power settings are required (such as for take off), However, using the variable nozzle, the duct could be designed with a somewhat smaller throat area such that optimum performance is achieved during cruise with the gap slightly open, with the moveable cowl portion in an intermediate position between the first and second positions. The nozzle would then by set to the first position during climb, and to the second position at or near full power for takeoff. While the invention has been described in conjunction with the exemplary embodiments described above, many equivalent modifications and variations will be apparent to those skilled in the art when given this disclosure.

Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A ducted fan gas turbine assembly comprising:
   a propulsive fan driven by a core engine,
   an annular bypass duct which receives an airflow from the fan and is bounded on the radially inward side by the core engine and on the radially outward side by an engine nacelle, the bypass duct terminating in a primary discharge nozzle for the duct airflow, and
   a thrust reverser assembly having a vane arrangement including a first set of turning vanes for channelling airflow from the duct in a rearward direction, and a second set of turning vanes for channelling airflow from the bypass duct in a forward direction; wherein:
   the nacelle has a stationary cowl portion and a movable cowl portion which is translatable rearwardly relative to the stationary cowl portion to open an annular gap therebetween,
   the cowl portions cooperate with the thrust reverser assembly to provide first, second and third operational configurations,
   in the first operational configuration the gap between the cowl portions is closed and the vane arrangement is stowed in the nacelle to prevent airflow from the duct flowing therethrough,
   in the second operational configuration the first set of turning vanes is positioned in the gap opened between the cowl portions to form an annular secondary discharge nozzle from the bypass duct for the duct airflow, such that the total effective flow area of the primary discharge nozzle and the gap in the second operational configuration is greater than the total effective flow area of the primary discharge nozzle in the first operational configuration,
   in the third operational configuration the second set of turning vanes is positioned in the gap opened between the cowl portions to divert the duct airflow through the second set of turning vanes and provide reverse thrust, and
   the vane arrangement is translatable relative to the stationary cowl portion rearwardly from a forward position in the first operational configuration to a rearward position in the third operational configuration.

2. A ducted fan gas turbine assembly according to claim 1, wherein the vane arrangement remains in the forward position in the second operational configuration.

3. A ducted fan gas turbine assembly according to claim 1, wherein the first set of turning vanes are positioned rearward of the second set of turning vanes.

4. A ducted fan gas turbine assembly according to claim 1, wherein the movable cowl portion is translated further rearwardly in the third operational configuration than in the second operational configuration to increase the width of the gap in the third operational configuration relative to the width of the gap in the second operational configuration.

5. A ducted fan gas turbine assembly according to claim 4, wherein the assembly includes a plurality of blocker doors which are stowed to permit airflow through the bypass duct in the first and second operational configurations, and deployed to block the bypass duct in the third operational configuration, the blocker doors being carried by the movable cowl portion and connected to the radially inward side of the bypass duct by respective drag links which pull the blocker doors across the duct when the movable cowl portion is translated further rearwardly in the third operational configuration.

6. A ducted fan gas turbine assembly according to claim 5, wherein the drag links are over-centre drag links which pass over-centre when the movable cowl portion is translated rearwardly from the first operational configuration to the second operational configuration.

7. A ducted fan gas turbine assembly according to claim 1 wherein the vane arrangement includes one or more cascade boxes which house the first set of turning vanes and the second set of turning vanes.

8. A ducted fan gas turbine assembly according to claim 1 wherein the first set of turning vanes and the second set of turning vanes both extend substantially entirely around the circumference of the bypass duct.

9. A vane arrangement for use in a thrust reverser assembly of a ducted fan gas turbine assembly according to claim 1.

\* \* \* \* \*